(12) United States Patent
Hsu (10) Patent No.: US 6,612,645 B1
(45) Date of Patent: Sep. 2, 2003

(54) BABY SEAT STRUCTURE FOR BICYCLES

(75) Inventor: Kuo Chung Hsu, Changhhua Hsien (TW)

(73) Assignee: Sunny Wheel Industrial Co., Ltd., Changhua Hsien (TW)

( * ) Notice: Subject to any disclaimer, the term of this patent is extended or adjusted under 35 U.S.C. 154(b) by 0 days.

(21) Appl. No.: 10/162,628

(22) Filed: Jun. 6, 2002

(51) Int. Cl.[7] .................................................. B62J 1/16
(52) U.S. Cl. ................... 297/195.13; 297/130; 280/650
(58) Field of Search ............................ 297/195.13, 130; 280/642, 643, 647, 648, 650, 657

(56) References Cited

U.S. PATENT DOCUMENTS

| | | | | |
|---|---|---|---|---|
| 3,619,003 A | * | 11/1971 | Rich, Jr. ..................... | 297/243 |
| 4,679,804 A | * | 7/1987 | Johnson ....................... | 280/30 |
| 4,728,119 A | * | 3/1988 | Sigafoo ....................... | 280/657 |
| 4,832,354 A | * | 5/1989 | LaFreniere ................... | 280/30 |
| 4,834,403 A | * | 5/1989 | Yanus et al. ................. | 280/30 |
| 4,872,692 A | * | 10/1989 | Steenburg .................... | 280/30 |
| 4,989,888 A | * | 2/1991 | Qureshi et al. ............... | 280/30 |
| 5,071,146 A | * | 12/1991 | Lewis et al. .................. | 280/30 |
| 5,383,585 A | * | 1/1995 | Weiss ......................... | 224/415 |
| 5,398,951 A | * | 3/1995 | Ryu ............................ | 280/30 |
| 6,367,821 B2 | * | 4/2002 | Thiele ........................ | 280/30 |

FOREIGN PATENT DOCUMENTS

| | | | |
|---|---|---|---|
| DE | 0232800 A2 | * | 2/1987 |
| FR | 2718410 A3 | * | 4/1994 |

* cited by examiner

Primary Examiner—Peter M. Cuomo
Assistant Examiner—Joseph Edell
(74) Attorney, Agent, or Firm—Bacon & Thomas, PLLC (57) ABSTRACT

An improved baby seat structure for bicycles has mainly a back unit, a seat unit connected to the back unit via coupling means and an L-shaped frame, an extensible handle set attached to the rear side of the back unit, two front-wheel bracket sets pivotally joined to the front of a seat body of said seat unit thereof, a base unit attached to the underside of the seat unit, a pair of rear-wheel bracket sets pivotally engaged with a wheel pivot body of said base unit via splined couplings, a mounting seat secured to the underside of the base unit, a plurality of inserted pins and screws, and a long round rod to engage the wheel pivot body thereof with a base body mounted thereon. Via a pair of eccentric means, the extensible handle set can be adjusted in height for use. Via the rotation of a pair of stopper blocks, up and down, and adjusting blocks, to and fro, the base body thereof can be swung up or down upon the wheel pivot seat thereof to relocate the L-shaped frame for adjusting the angle of the back unit thereof. Via rotary heads and rotary wheels, the front-wheel and rear-wheel bracket sets can be either let down or folded up respectively for different uses such as a stroller or a normal baby seat. Via triangular fixing pieces and wing panel, the mounting seat thereof can be fixedly fastened to a rear carrier of a bicycle for the use of a bicycle baby seat.

15 Claims, 12 Drawing Sheets

FIG. 1

PRIOR ART

BABY SEAT STRUCTURE FOR BICYCLES

BACKGROUND OF THE INVENTION

The present invention is related to a baby seat structure for bicycles, comprising mainly a back unit, a seat unit, an extensible handle set, two front-wheel bracket sets, two rear-wheel bracket sets, a base unit, a mounting seat, a plurality of inserted pins and screws, and a long round rod wherein via a pair of eccentric means, said extensible handle set can be adjusted in height at the rear side of said back unit thereof, and via the rotation of a pair of stopper blocks and adjusting blocks, a base body of said base unit can be swung up or down upon a wheel pivot seat to relocate an L-shaped frame for adjusting the angle of said back unit thereof. Via rotary heads and rotary wheels, said front-wheel and rear-wheel bracket sets can be either let down or folded up respectively for different uses such as a stroller or a normal baby seat. Via triangular fixing pieces and a wing panel, said mounting seat thereof can be fixedly fastened to a rear carrier of a bicycle for the use of a bicycle baby seat.

Figure 1:
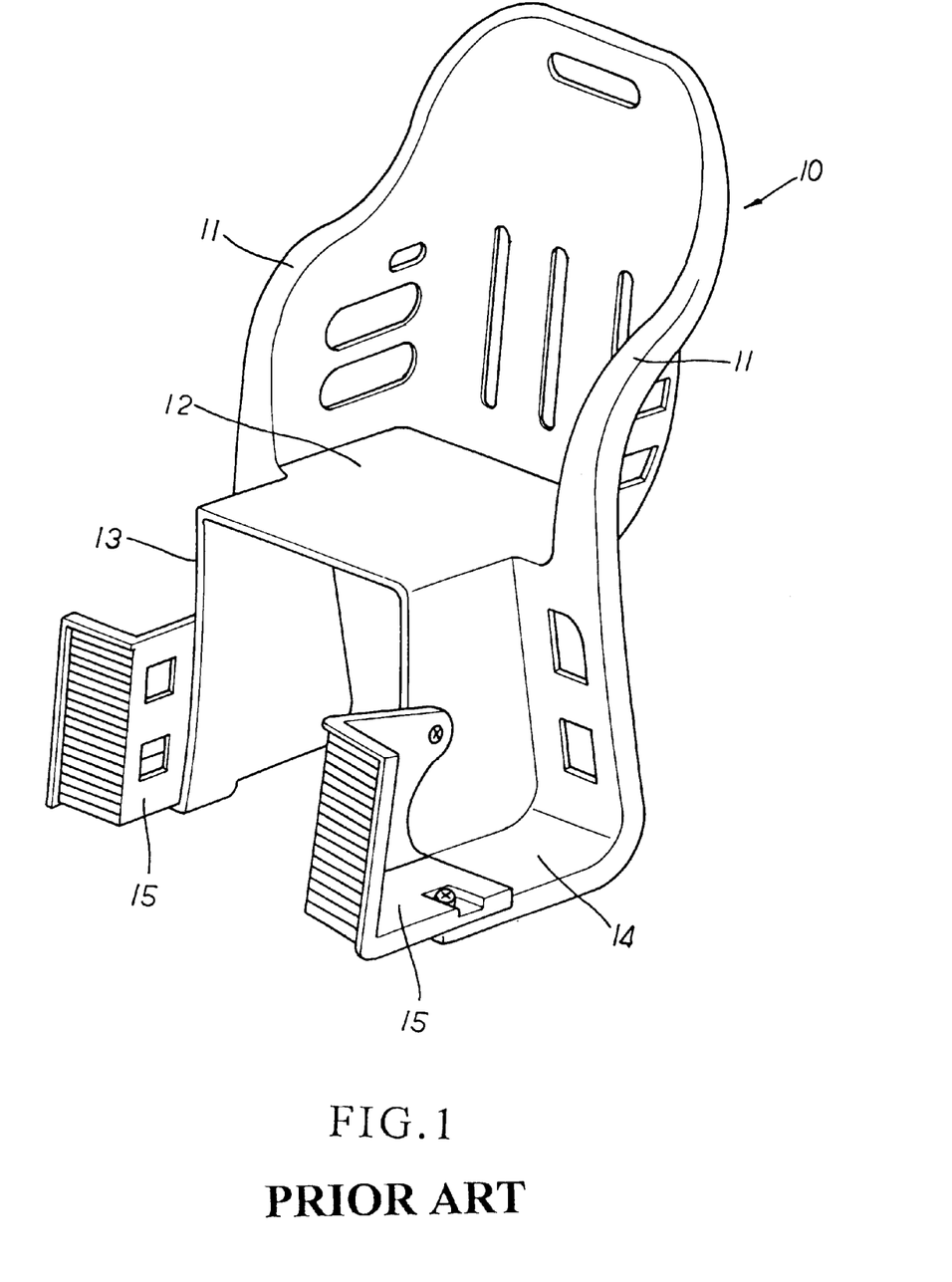
FIG. 1 is a perspective view of a conventional baby seat structure.

Please refer to FIG. 1. A conventional baby seat structure for bicycles usually has a back body 10 with a pair of arm boards 11 extending at both lateral sides thereof, a seat plate 12 with a pair of side plates 13 extending downwards at both lateral sides thereof, a pair of footboards 14 connected with said arm boards 11 at the inner side and said side plates 13 at one lateral side thereof, and a pair of foot guards 15 attached to the outer side of said footboards 14 thereof. There are several drawbacks to such conventional baby seat structure for bicycles. First, said baby seat structure can only be adapted to the bicycles for use, which is simple in function and greatly reduced in its efficiency and practical uses. Second, said back body 10 thereof cannot be adjusted in angle to cater to the comfort of the users. Third, said footboards 14 are fixedly located, unable to meet the height of different users.

SUMMARY OF THE PRESENT INVENTNION

It is, therefore, the primary purpose of the present invention to provide a multifunctional baby seat structure which can be adapted to a rear carrier of a bicycle as a bicycle baby seat, or used as a baby stroller, or simply as a normal baby seat.

It is, therefore, the second purpose of the present invention to provide an improved baby seat structure wherein said improved baby seat structure thereof has a back unit which can be adjusted into different angles to cater to the comfort of different users.

It is, therefore, the third purpose of the present invention to provide an improved baby seat structure wherein said baby seat thereof is provided with a pair of footboards which can be adjusted to fit the height of different users.

BRIEF DESCRIPTION OF THE DRAWINGS

FIG. 3-A is an exploded enlarged view of a seat unit and a front-wheel bracket of the present invention.

FIG. 3-B is an exploded enlarged view of a rear-wheel bracket of the present invention.

FIG. 3-C is an exploded enlarged view of a base unit of the present invention.

FIG. 3-D is an exploded enlarged view of a mounting seat of the present invention.

FIG. 5 is a diagram showing the adjustment of said back unit thereof in angles.

FIG. 5-A is a partially enlarged diagram showing the rotation of a stopper block and an adjusting block of the present invention.

DETAILED DESCRIPTION OF THE PREFERRED EMBODIMENTS

Figure 2:
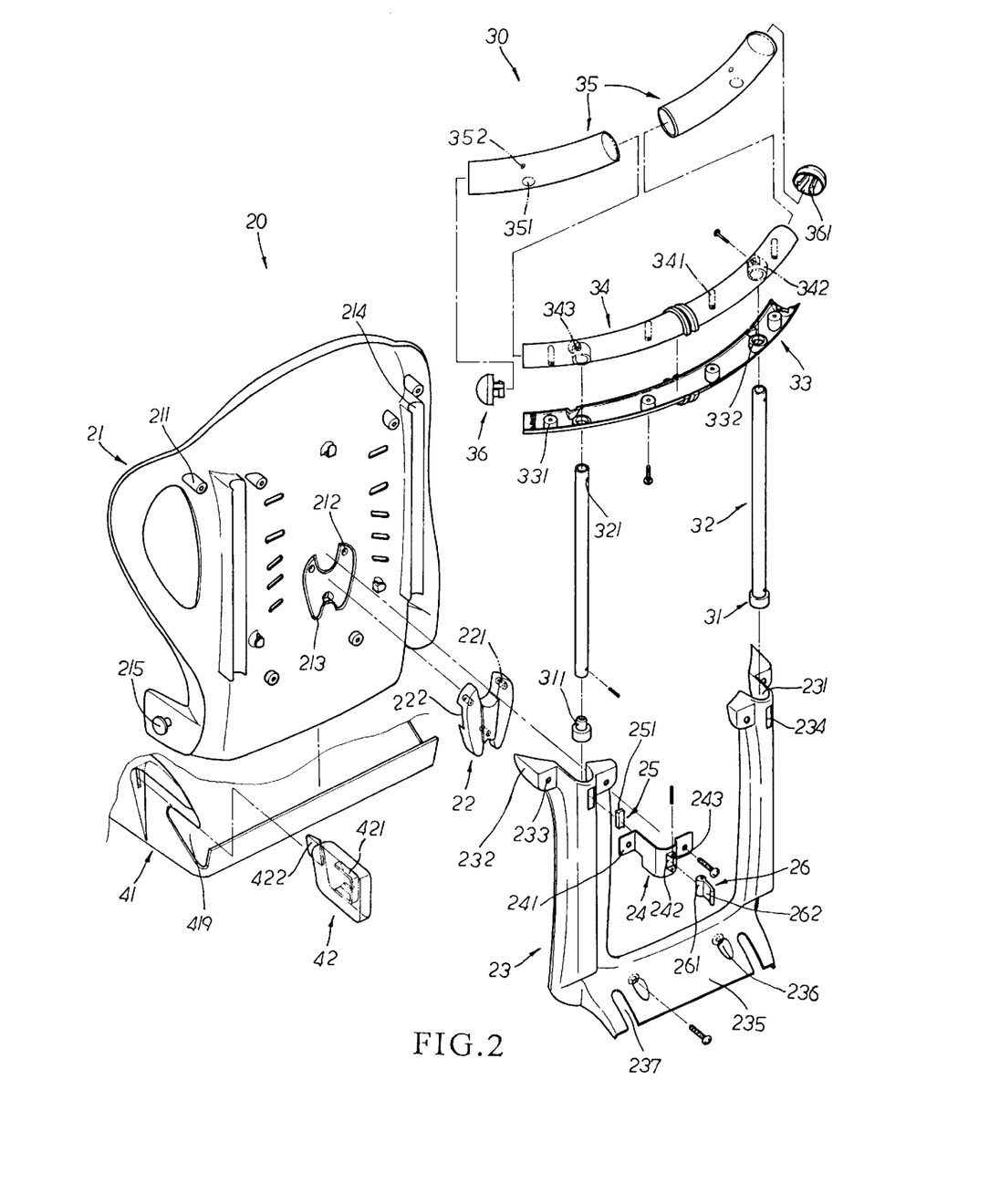
FIG. 2 is a perspective exploded view of a back unit of the present invention.
Figure 3:
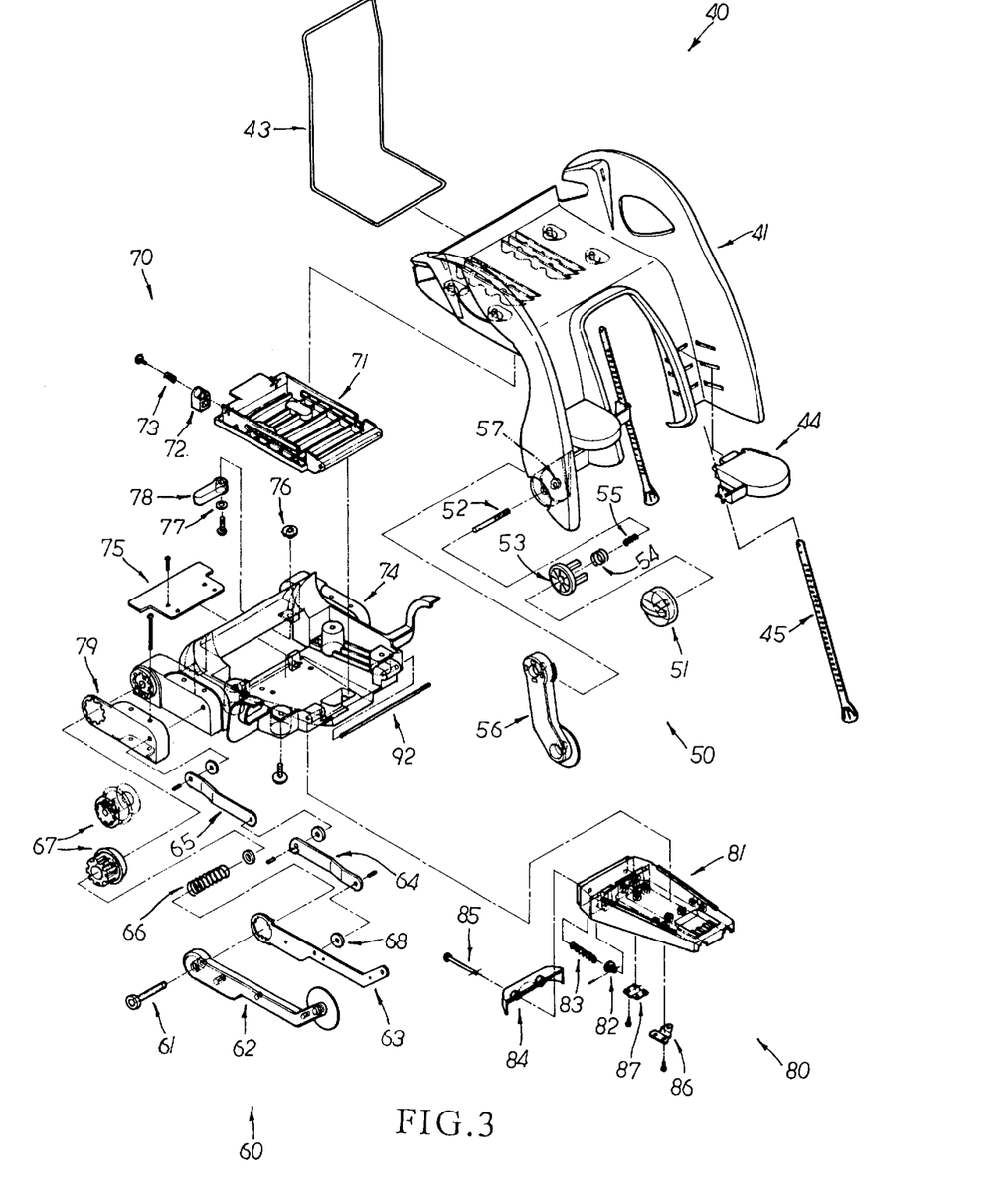
FIG. 3 is a partially exploded view of the present invention.

Please refer to FIGS. 2, 3, and FIGS. 3-A, 3-B, 3-C, and 3-D. The present invention is related to an improved baby seat structure for bicycles, comprising a back unit 20, an extensible handle set 30, a seat unit 40, two front-wheel bracket sets 50, two rear-wheel bracket sets 60, a base unit 70, a mounting seat 80, a plurality of inserted pins 90, a plurality of screws 91 and a long round rod 92.

Please refer to FIG. 2. The back unit 20 is made up of a back body 21, a securing block 22, a sleeve body 23, two fixing members 24, two friction blocks 25, two eccentric means 26, and said extensible handle set 30. The rear side of said back body 21 is provided with a plurality of fixing columns 211 distributed at both upper and lower sections thereof, a plurality of screw holes 212 circumscribed by an indented groove 213 at the middle section thereof, and a pair of arch sliding grooves 214 extending vertically at both left and right sections thereof. A two-stepped locating post 215 is disposed at both lower lateral sides of said back body 21 respectively. The securing block 22, wide top and narrow bottom in shape, is provided with a plurality of fitting posts 221 aligned into a triangular shape at the inner top and lower sections thereof, and two recesses 222 defining both lateral flanges at the middle section thereof. The sleeve body 23, a U-shaped block body, is equipped with a pair of semi-round guide ways 231 extending vertically at both left and right arms thereof. The top end of each semi-round guide ways 231 thereof is provided with a pair of securing plates 232, each having a securing hole 233 disposed thereon, extending outwards from both left and right sides thereof, and an elongated slot 234 disposed at the front side thereof. The transverse bottom side of said sleeve body 23 is provided with an engaging plate 235 having a pair of screw holes 235 disposed thereon and a pair of U-shaped engaging slots 237 defining both left and right sides thereof, extending out and downwards thereof.

The fixing member 24 is provided with a pair of fixing plates 241, each having a through hole disposed thereon, extending outwards at both left and right sides thereof and an elongated through hole 242 disposed at the front side thereof. Both top and bottom sides of said elongated through slot 242 are extended outwards with a pair of semi-round fixing parts 243, each having a through hole disposed thereon. The friction block 25, an elongated block body, is defined by elongated grooves 251 at the front side thereof. The eccentric means 26 is equipped with an oval-shaped pivot head 261 disposed at one side and a push blade 262 extending at the other side thereof. The oval-shaped pivot head 261 is provided with a through hole at the non-central section thereof.

The extensible handle set 30 comprises two stop parts 31, two extensible inner tubes 32, a lower tube 33, an upper tube 34, two outer tubes 35, and two stopper covers 36. The stop part 31, a two-stepped round column, has a pin hole 311 disposed at the outer sphere of the small-diameter step thereof. The extensible inner tube 32, a round pipe body, has a fixing hole 321 disposed at the outer sphere of both upper and lower ends thereof respectively. The lower tube 33, a semi-round tubular body and faced upwards, is provided with a plurality of engaging columns 331 equidistantly distributed at the bottom thereof, and a pair of engaging grooves 332 disposed at both left and right sides thereof. The upper tube 34, a semi-round tubular body and faced downwards, is provided with a plurality of engaging posts 341 equidistantly distributed at the bottom thereof, and a pair of projecting fixed columns 342 disposed at both left and right sides thereof. Each of said projecting fixed column 342 has an inserting hole 343 disposed at one side of the upper section thereof. The outer tube 35, a round tubular body, is provided with an engaging groove 351 disposed at the bottom thereof and an engaging hole 352 disposed at one side of the outer sphere thereof. The stopper cover 36, a semi-round cover body, has a pair of hook plates 361, each extending into an inverted hook at the inner side thereof.

Figure 3A:
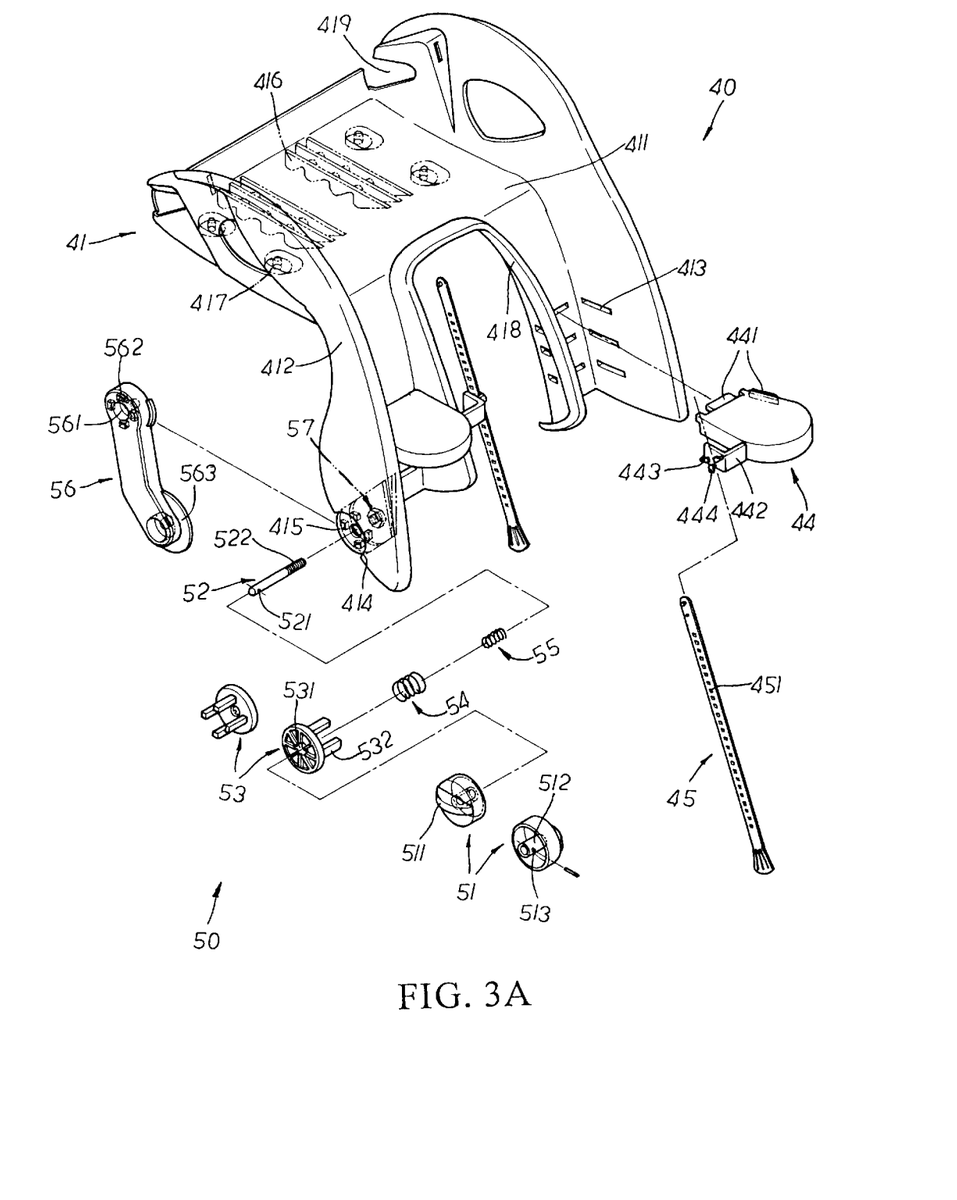

Please refer to FIGS. 2, 3, 3-A. The seat unit 40 is equipped with a seat body 41, two coupling parts 42, an L-shaped frame 43, two footboards 44, and two supporting plates 45. The seat body 41 is made up of an inverted L-shaped seat board 411 and arched side flanges 412 projecting at both lateral sides thereof. At the lower front side of said seat board 411 and the inner side of both arched side flanges 412 thereof are disposed a multiple of equidistantly inserting slots 413. At the lower outer side of both arched side flanges 412 are disposed a pair of semi-arch receiving grooves 414, each equipped with a pair of fixing plates 415 with pin holes disposed at the center thereof. One of said fixing plate 415 disposed at the outer sides thereof is further provided with four slots. The underside of said seat board 411 is provided with a multiple of serrated engaging ribs 416 and four screw columns 417, and the front side thereof is disposed an inverted U-shaped recess defined by projecting flanges 418 and inserting slots 413 at the edges thereof. A slant indent 419 is disposed at the rear end of each said arch side flange 412 thereof.

The coupling part 42, an elongated box body and faced inwards, has an L-shaped sliding groove 421 disposed at the interior therein, and an elongated fixing piece 422 projecting at the front side thereof. The footboard 44 has locating pieces 441 disposed at the rear side and the back of one lateral side thereof, and an L-shaped hook means 442 projecting at the front of the other lateral side thereof. Said L-shaped hook means 442 is equipped with a pair of hook pieces 443 and a locating key 444 disposed below said hook pieces 443 at the bottom side thereof. The supporting plate 45, a plate body of wide bottom and narrow top, has three oval through holes disposed at the bottom thereof, and a multiple of elongated locating holes 451 equidistantly distributed at the middle section thereon.

Please refer to FIG. 3-A. The front-wheel bracket set 50 comprises a rotary head 51, a locking bolt 52, an engaging block 53, a big spring 54, a small spring 55, a front-wheel bracket 56, and a screw nut 57. Said rotary head 51, a circular cover body and faced inward, has a rotary plate 521 disposed at the outer top side thereof, and a sleeve rod 512 with an inserted hole 513 disposed at one end thereon projecting at the inner side thereof. Said locking bolt 52 has a fitting hole 521 disposed at one side of one end thereof and outer threads 522 disposed at the other end thereof. Said engaging block 53, circular in shape, is provided with a slot 531 disposed at the center thereof, and four engaging legs 532 projecting at the inner side from the edge thereof. Said front-wheel bracket 56 is provided with a locating groove 561 disposed at the upper side thereof, four locating holes 562 encircling said locating groove 561 thereof, and a rolling wheel 563 pivotally joined to the bottom side thereof.

Figure 3B:
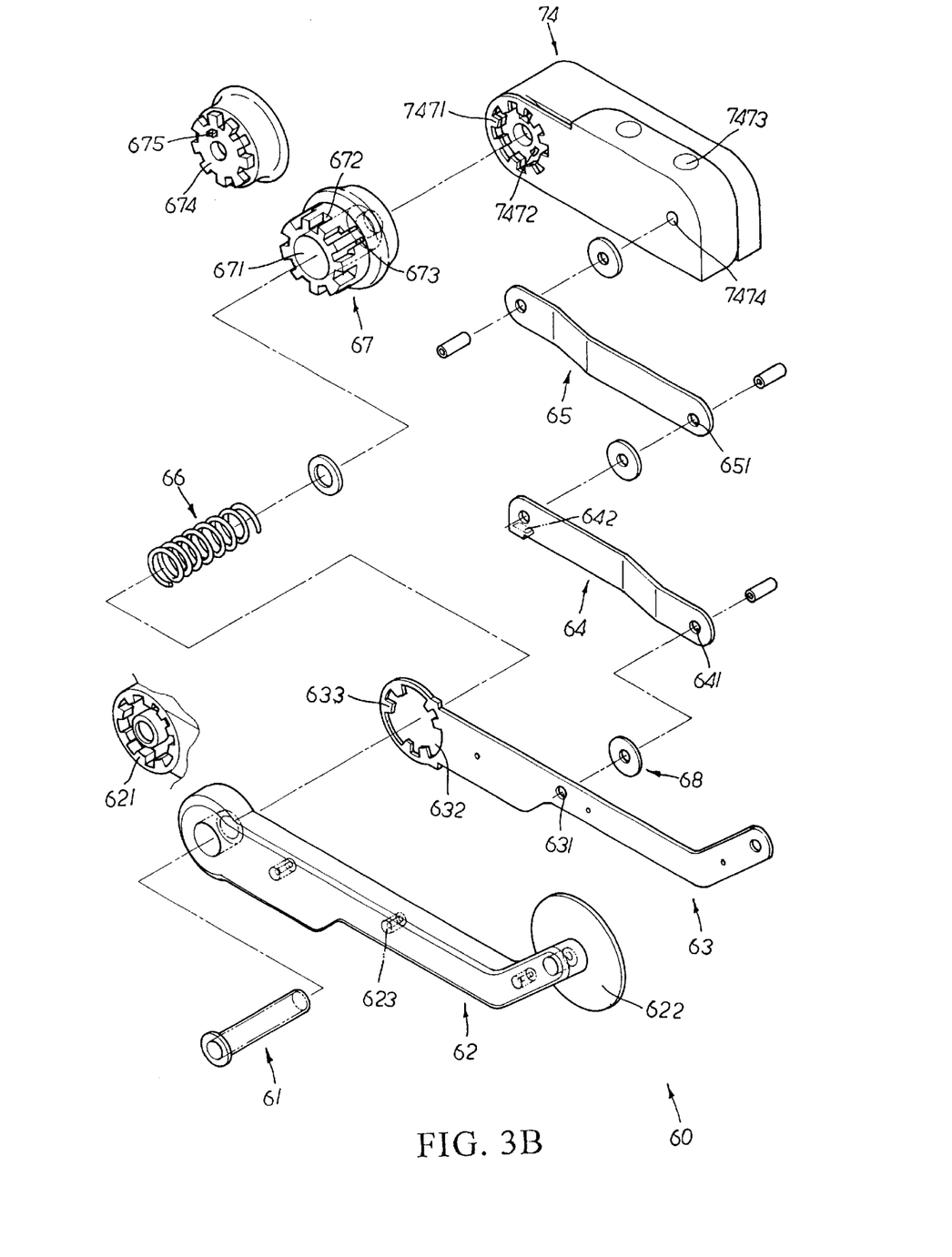

Please refer to FIG. 3-B. The rear-wheel bracket set 60 comprises a rivet 61, a rear-wheel bracket 62, a strengthening plate 63, a linking plate 64, an extensible plate 65, a compressing spring 66, a rotary wheel 67, and a multiple of ring washers 68. The rear-wheel bracket 62 has a splined projecting hole 621 disposed at the inner side of one end thereof, and a rolling wheel 622 pivotally joined at the other end thereof with a multiple of screw piles 623 disposed at the inner middle section thereof. The strengthening plate 63 has a multiple of screw holes 631 disposed thereon, a ring 632 defined by three sets of equidistant engaging keys 633 disposed at one end thereof. The linking plate 64 has a linking hole 641 disposed at both ends thereof respectively, and an abutting block 642 disposed at the bottom side of one end thereof. The extensible plate 65 has a pivot hole 651 disposed both ends thereof respectively. The rotary wheel 67 is equipped with a two-stepped through hole 671 disposed at the center therein, splined groove 672 disposed at one side thereof, three equidistant indents 673 further defined the inner side of said splined groove 672 thereof, a splined shaft 674 disposed at the other side thereof, and a key 675 projecting at the surface of said splined shaft 674 thereon.

Figure 3C:
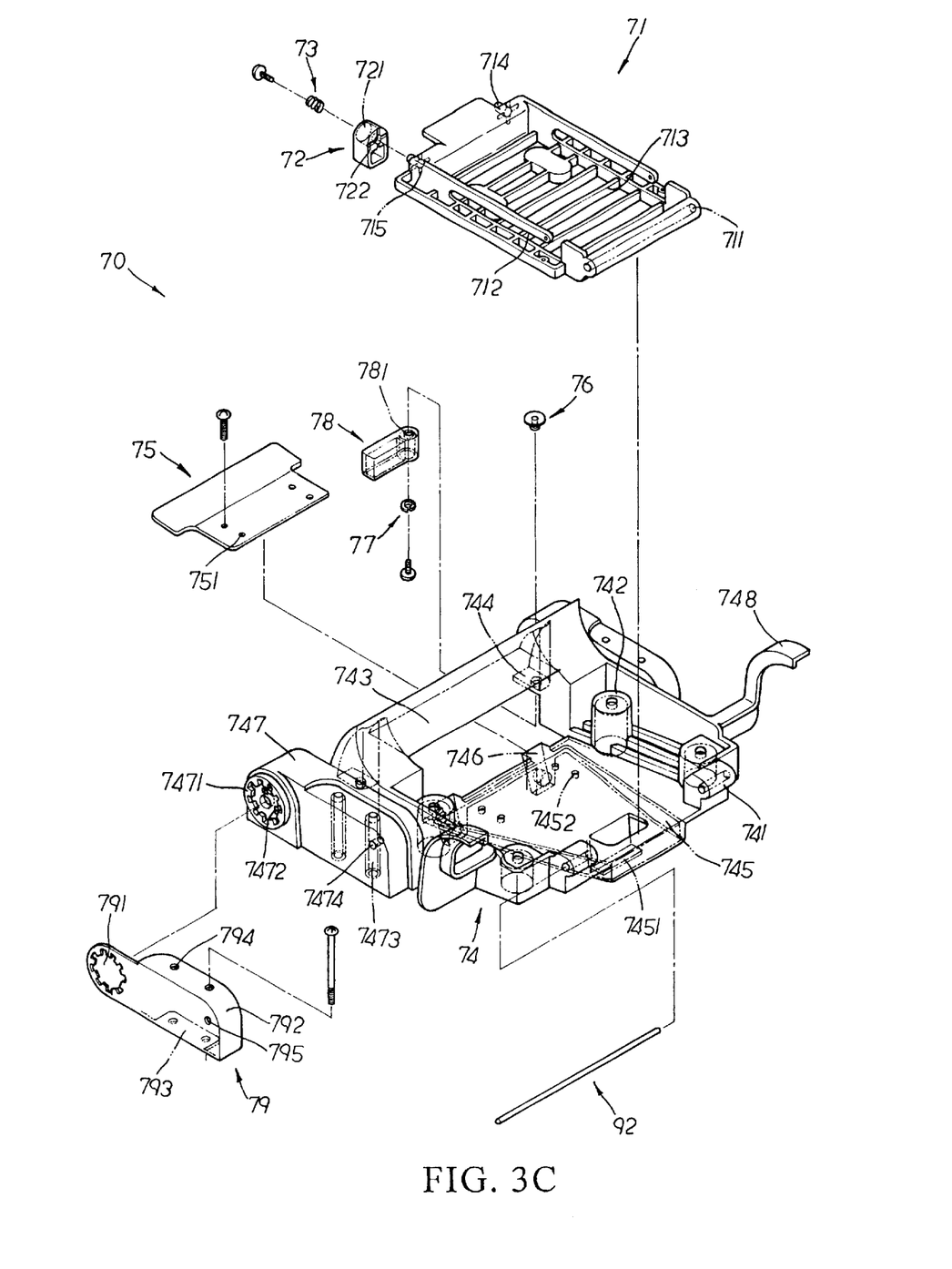

Please refer to FIGS. 3, 3-C. The base unit 70 comprises a base body 71, two stopper blocks 72, two springs 73, a wheel pivot seat 74, a strengthening piece 75, two strengthening rods 76, two spring washers 77, two adjusting blocks 78, and two splined plates 79. The base 71 is made up of a long pivot hole 711 disposed at the front side thereof, a pair of sliding slots 712 disposed at both lateral sides thereof, a multiple of locating flanges 713 equidistantly disposed at the bottom side thereof, a pair of hollow inserting posts 714 disposed at the rear left and right sides thereof, and four engaging ribs 715 disposed at the surface of each said hollow inserting post 714 thereof. The stopper block 72 is provided with a two-stepped rotary hole 721 disposed at the upper section thereof, four engaging holes 722 disposed at the front surface of the smaller diameter of said two-stepped rotary hole 721 thereof. The wheel pivot seat 74 is equipped with two pivot blocks 741 disposed at both left and right front sides thereof, four fixing columns 742 disposed at the top surface thereof, an arch shell 743 extending upwards at the rear side thereof, two pivot members 744 with pivot holes disposed at both left and right sides of said arch shell 743 thereof, and a trapezoid retaining room 745 defined at the front bottom side thereof.

Said trapezoid retaining room 745 has an inserting part 7451 disposed at the front inner side thereof, and four through holes 7452 disposed at the middle top side thereof. At the left and right back side of said trapezoid retaining room 745 is disposed a pair of mounting plates 746 with fixing holes disposed thereon. And a pair of elongated arch splined couplings 747 is disposed at the rear lateral sides of said base 74 thereof. At one end of said splined coupling 747 is disposed a splined joint 7471 having a slot disposed at the center thereof and two stopper grooves 7472 disposed at the outer surface thereof. At the top surface of said splined coupling 747 are disposed two screw columns 7473 extending vertically downwards, and a pin hole 7474 disposed at one lateral side thereof. A pair of wheel guards 748 is disposed at the front left and right sides of said base 74 thereof.

The strengthening piece 75 is made up of a large and a small parts with four screw holes 751 distributed at the surface of the small part thereof, and the strengthening rod 76 is formed a two-stepped hollow column. The adjusting block 78, an elongated block body, is provided with a two-stepped pivot hinge 781 disposed at one lateral side thereof. The splined plate 79 has a splined hole 791 disposed at one side thereof, an arch flange 792 circumscribing the other side thereof, and a fixing means 793 extending at the bottom side thereof. The top surface of both said arch flange 792 and said fixing means 793 are provided with a pair of screw holes 794 respectively, while a pin hole 795 is disposed at the other side of said splined hole 791 thereof.

Figure 3D:
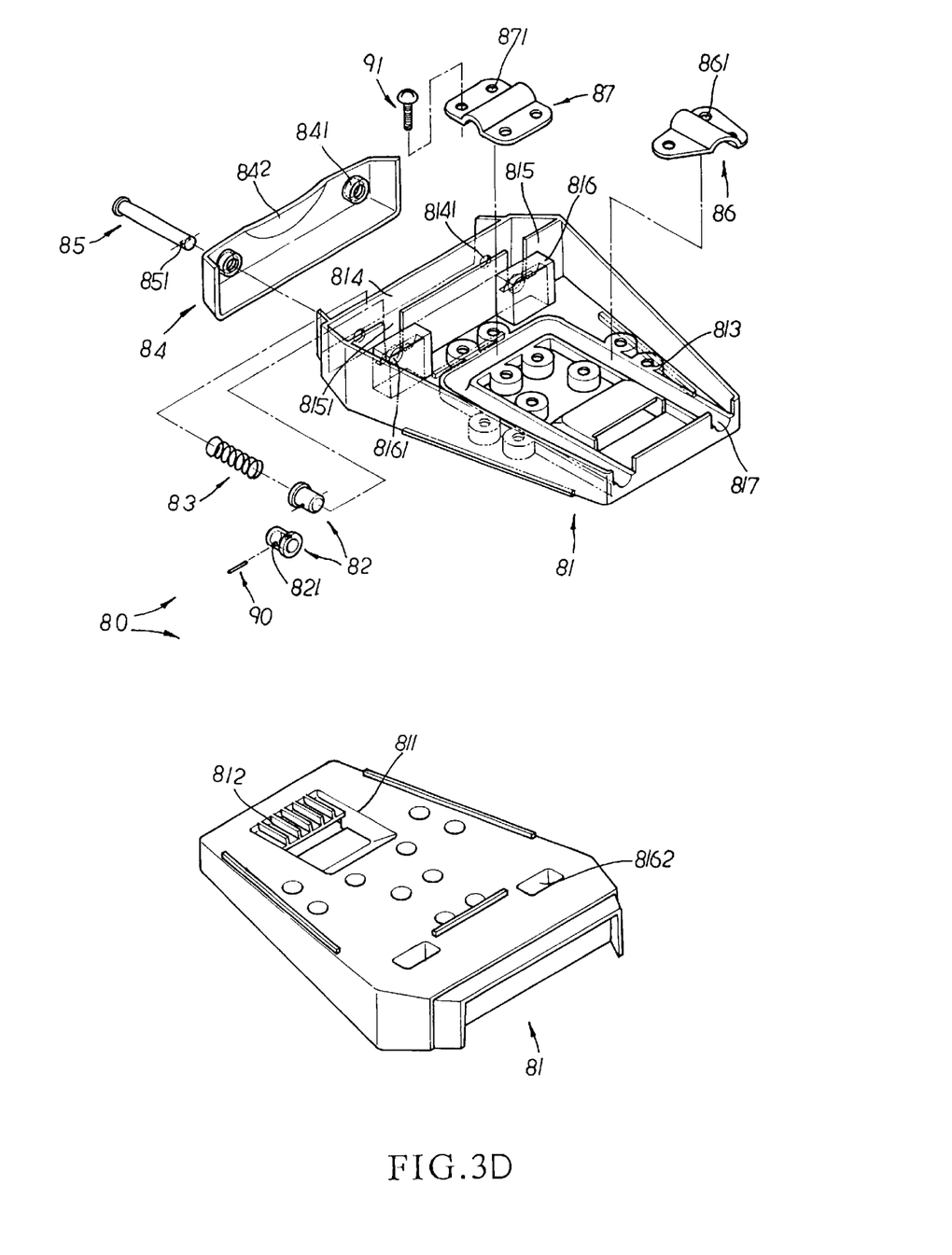

Please refer to FIG. 3-D. The mounting seat 80 is equipped with a mounting body 81, two pin blocks 82, two compressing springs 83, a drawing member 84, two inserting bolts 85, two triangular fixing pieces 86, and a wing panel 87. The mounting body 81 is formed a trapezoid housing, having a slide guide way 811 disposed at the front top side thereof, a multiple of ribs 812 projecting at the front of said slide guide way 811 thereof, a multiple of locating posts 813 distributed properly at the underside thereof, and a mounting piece 814 with left and right mounting holes 8141 disposed thereon disposed at the back side thereof. An inserting piece 815 having left and right U-shaped escape grooves 8151 defined thereon is disposed, corresponding to said mounting piece 814. A pair of left and right rectangular inserting blocks 816, each having a connecting holes 8161 disposed at one side, is abutted against said inserting piece 815 thereof with said connecting holes 8161 thereof corresponding to said U-shaped escape grooves 8151 and said mounting holes 8141 thereof. The top side of each said inserting block 816 is provided with an engaging slot 8162 and the underside of said mounting body 81 is defined by a U-shaped retaining groove 817.

The pin block 82, a two-stepped means, has a pin hole 821 disposed at the end of smaller diameter thereof. The drawing member 84 is provided with a pair of mounting columns 841 disposed at the left and right sides thereof, and an arch drawing part 842 disposed at the upper middle section thereof. The inserting bolt 85, a two-stepped bolt, has an inserting hole 851 disposed at the front end of the smaller diameter thereof. The triangular fixing piece 86 defined by an arch in the middle has fixing holes 861 disposed at the three corners thereof, while said wing panel 87, a rectangular wing body with an arch middle section, is provided with four fitting holes 871 disposed at the four corners thereof.

Figure 4:
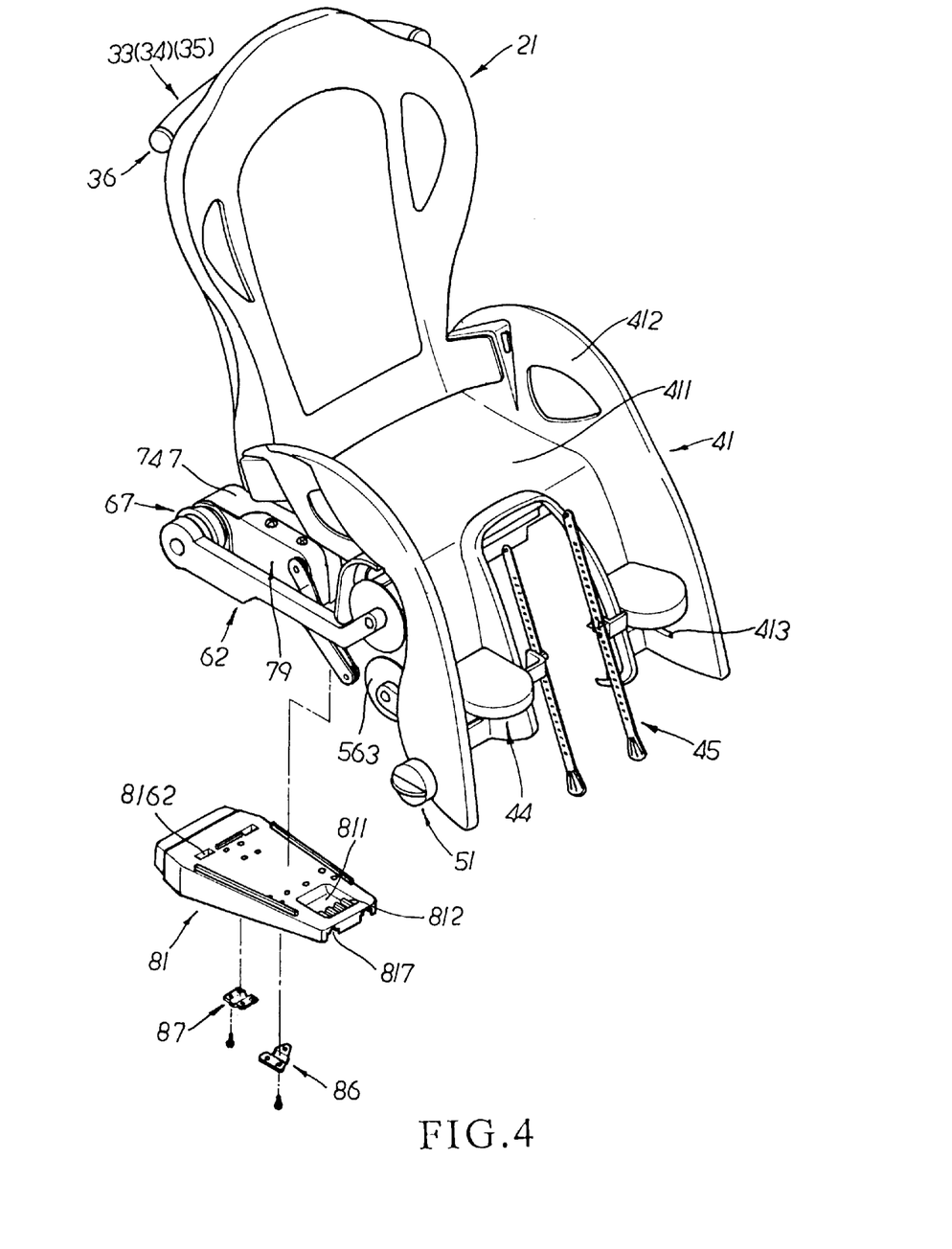
FIG. 4 is a perspective view of the present invention in assembly.

Please refer to FIG. 4. In assembly, the stop parts 31 are located at the lower end of said extensible inner tubes 32 and fixedly joined via inserted pins 90 led through said fixing holes 321 and said pin holes 311 thereof. Said upper and lower tubes 34, 33 are closed and fixedly engaged therewith via screws 91 screwed up said engaging columns 331 and said engaging posts 342 thereof. The outer tube 35 is guided and sleeve joined to the periphery of said engaged upper and lower tubes 34, 33 thereof. Said extensible inner tubes 32 are inserted to said projecting fixed columns 342 thereof and securely joined thereto via inserted pins 90 led and fixed said engaging holes 352, inserting holes 343 and fixing holes 321 thereof. Said stopper covers 36 are located and hooked to both ends of said engaged upper, lower tubes 34, 33, and outer tubes 35 thereof via said hook plates 361 thereof.

The sleeve body 23 is placed at the rear side of said back body 21. Said fixing members 24 are located at the upper section of said semi-round guide ways 231 thereof with said fixing plates 241 thereof abutting against said securing plates 232 thereof. Screws 91 are adapted to fixedly attach said sleeve body 23 to said back body 21 via said fixing plates 241 and said securing plates 232 thereof screw joined to the fixing columns 211 disposed at the upper section of said back body 21 thereof, and also via said screw holes 236 thereof engaged with the fixing columns 211 disposed at the lower section thereof. The extensible inner tubes 32 are led through the space formed by said arch sliding grooves 214 and said semi-round guide ways 231 thereof. The friction blocks 25 are led through the elongated through holes 242 thereof and pushed to the inner side of said elongated slots 234 thereof. The eccentric means 26 are located at said fixing members 24 via inserted pins 90 led through said fixing parts 243 and abutted tightly against said friction blocks 25 at one lateral side thereof. The two-stepped locating posts 215 are guided through the slant indents 419 thereof and located thereto via said coupling parts 42 whose sliding grooves 421 disposed therein are led through said locating posts 215 thereof and engaged said coupling parts 42 thereto. Via said coupling parts 42, said back body 21 can be adjusted back and forth within said slant indents 419 thereof.

The L-shaped frame 43 is abutted against the rear side of the back body 21 and the underside of said seat body 41. The lower section of said L-shaped frame 43 is engaged with said serrated engaging ribs 416 thereof and the upper section thereof is located by the U-shaped engaging slots 237 thereof to abut against the rear side of said back body 21. The securing block 22 is fixed to the indented groove 413 via screws 91, limiting the upper end of said L-shaped frame 43 at the recesses 222 therein. Said back body 21 will be limited in movement due to said L-shaped frame 43. The footboards 44 are inserted to the inserting slots 413 of proper height via said locating pieces 441. The supporting plates 45 are guided through said hook pieces 443 and fixed via said locating holes 451 thereof hooked to locating keys 444 of proper height for location.

The locking bolt 52 is inserted to the sleeve rod 512 of said rotary head 51 thereof and fixedly attached thereto via an inserted pin 90 led through said pin hole 513 and said fitting hole 521 thereof. Said engaging block 53 is led through said locking bolt 52 and received at the interior of said rotary head 51 thereof. The big spring 54 with said small spring 55 engaged therein is sleeve joined to the periphery of said sleeve rod 512 thereof. The front-wheel bracket 56 is located at said receiving groove 414 defined by said fixing plates 415 thereof. Said locking bolt 52 engaged with said rotary head 51 at one end is led through one of said fixing plate 415 thereof and the locating groove 561 thereof to be screwed up to the screw nut 57 disposed at the other fixing plate 415 thereof via said outer threads 522 disposed at the other end thereof. The four engaging legs 531 of said engaging block 53 thereof, inserted onto the four slots of said fixing plate 415 thereof and said four locating holes 562 thereof, will fixedly locate said front-wheel bracket 56 onto said fixing plates 415 thereof.

The stopper block 72 is joined to the hollow inserting post 714 via said two-stepped rotary hole 721 with the four engaging holes 722 thereof matching and joining to said four engaging ribs 715 thereof. A screw 91 with the spring 73 sleeve joined at the periphery thereof is led through the two-stepped rotary hole 721 and fastened to the hollow inserting post 714, having said spring abutted against the small step of said two-step rotary hole 721 therein. Via said hollow inserting post 714 as a pivot, said stopper block 72 can be rotated up and down thereon. Said strengthening piece 75 is screw joined to the four through holes 7452 of said trapezoid retaining room 745 thereof via the four screw holes 751 thereof. The spring washer 77 is located at the two-stepped pivot hinge 781 of said adjusting block 78 thereof. The small step of said two-step strengthening rod is adapted to cover the top side of said pivot member 744 thereof. Said adjusting block 78 is then located at the underside of said pivot member 744 and pivotally joined thereto via a screw 91. Via said pivot member 744, said adjusting block 78 can be rotated back and forth thereon.

The long round rod 92 is led through the long pivot hole 711 thereof and the two pivot blocks 741 thereof at both end, engaging said base body 71 thereof with said wheel pivot seat 74 thereof at the front side thereof. The base body 71 is located at the top surface of said wheel pivot seat 74, abutting against said adjusting blocks 78 at both rear left and right sides thereof. Said stopper blocks 72 are then rotated downwards at the other side of said adjusting blocks 78 to locate said adjusting blocks 78 into position, preventing said adjusting blocks 78 from being dislocated in use. Said wheel pivot seat 74 with said base body 71 located thereon is screw joined to the underside of said seat body 41 via screws 91 engaging the four fixing columns 742 thereof and said four screw columns 417 thereof. Said L-shaped frame 43 is engaged with said locating flanges 713 thereof at the bottom side thereof. Said splined plates 79 are engaged with said splined couplings 747 thereof via bolts joining the screw holes 794 thereof and the screw columns 7473 thereof.

The strengthening plate 63 is fastened to said rear-wheel bracket 62 via screws 91. The compressing spring 66 is led and located at the large step of said two-stepped through hole 671 thereof. The rivet 61 along with a ring washer 68 is guided through said splined projecting hole 621 and said two-stepped through hole 671 thereof, and rivet joined to the slot disposed at the center of said splined joint 7471 thereof, pivotally engaging said rear-wheel bracket 62 and said rotary wheel 67 thereof with said wheel pivot seat 74 thereof. The extensible plate 65 along with a ring washers 68 is pivotally joined at one end to said splined coupling 747 thereof and said splined plate 79 attached thereto via an inserted pin 90. The linking plate 64 along with a ring washer 68 is pivotally fixed at one end to the screw hole 631 of said strengthening plate 63 via an inserted pin 90. The other end of said linking plate 64 along with a ring washer 68 is pivotally secured to the other end of said extensible plate 65 so that said extensible plate 65 can be stretched outwards for a certain distance for use.

The inserting bolts 85 are led through the mounting columns 841 thereof, and said compressing springs 83 are sandwiched at said mounting piece 814 and said inserting piece 815 therebetween. The small step of said two-stepped pin blocks 82 is led to the connecting holes 8161 thereof. Said drawing member 821 with said inserting bolts 85 attached thereto is covered from the back of said mounting body 81, having said inserting bolts 85 led through the mounting holes 8141 thereof, said compressing springs 83 thereof, and the U-shaped escape grooves 8151 thereof and sleeve joined to said pin blocks 82 thereof. Inserted pins 90 are adapted to fixedly connect said inserting bolts 85 and said pin blocks 82 thereof via said engaging slots 8162 thereof to complete the assembly of the present invention.

Figures 5, 5A:
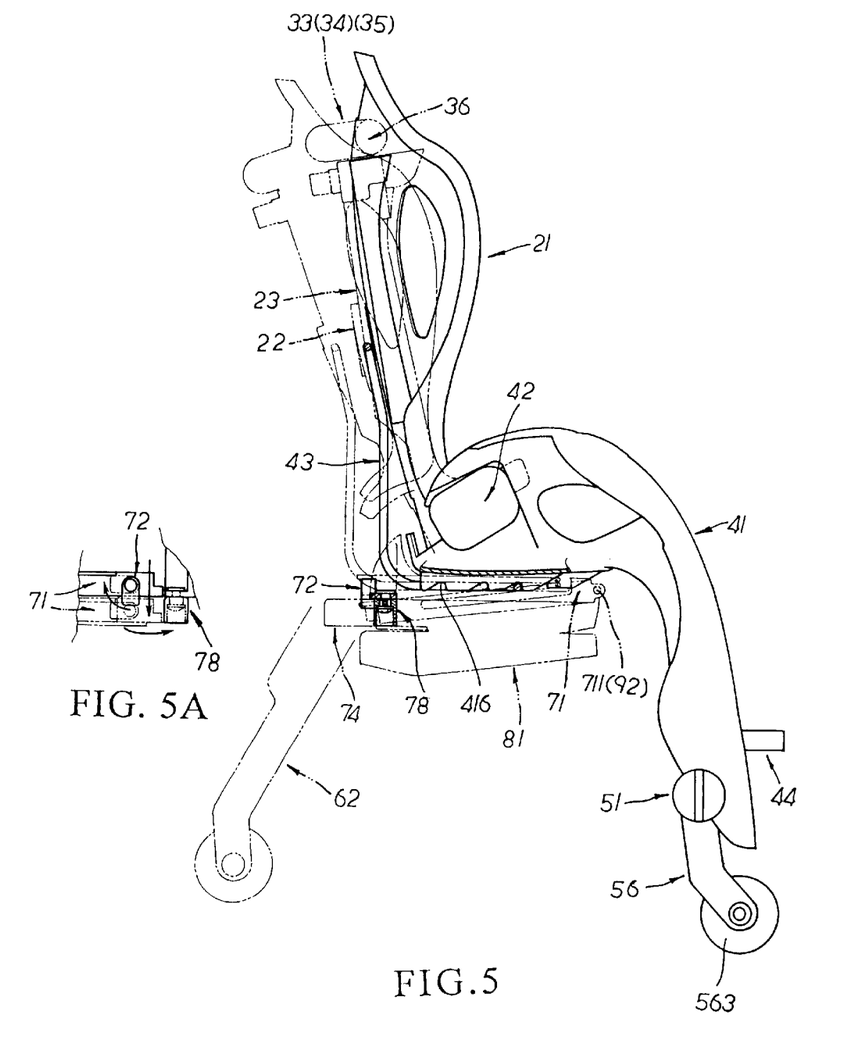

Please refer to FIG. 5. To adjust the angle of said back body 21 thereof, said stopper blocks 72 thereof are rotated upwards for said adjusting blocks 78 thereof to be rotated outwards as shown in FIG. 5-A. Without the abutment of said adjusting blocks 78 thereof, said base body 71, hinging on said pivot blocks 741 thereof at the front, will descend for a certain height at the rear side thereof. Said L-shaped frame 43 can then be dislocated from said locating flanges 713 and easily adjusted back and forth on said serrated engaging ribs 416 thereof. Meanwhile, said back body 21 will be adjusted into different angles depending on the movement of said L-shaped frame 43. When said back body 21 is adjusted into a proper angle, said base body 71 is raised upwards, and said adjusting blocks 78 and said stopper blocks 72 are rotated back to abut tightly against said base body 71 thereof. Said L-shaped frame 43 is re-located and engaged with said locating flanges 713 thereof and said back body 21 is proper adjusted into an angle.

Figure 6:
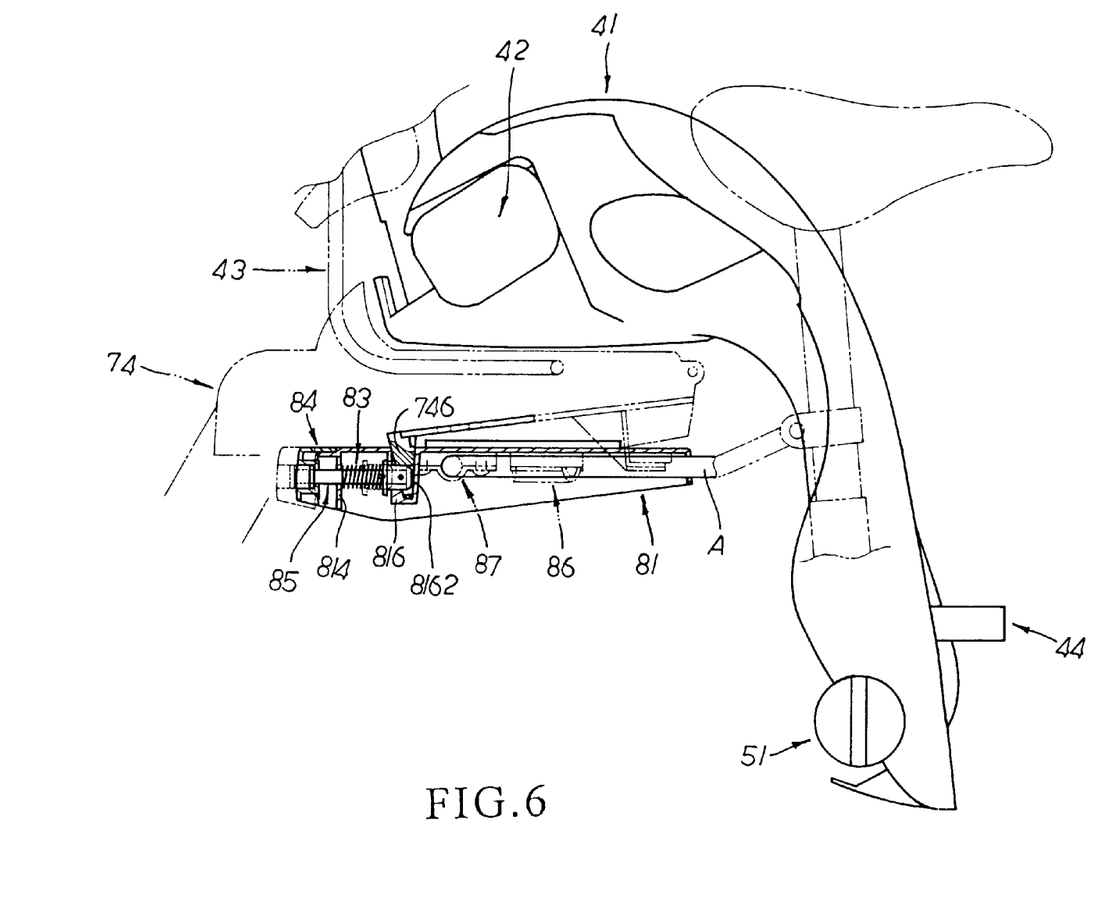
FIG. 6 is a diagram showing the mounting of the present invention onto a rear carrier of a bicycle in practical use.

Please refer to FIG. 6. To assembly the present invention onto a rear carrier A of a bicycle, the ribs 812 of said mounting body 81 thereof are led through the slide guide way 811 of said wheel pivot seat 74 and engaged with the inserting part 7451 thereof. The drawing member 84 engaged with said mounting body 81 is withdrawn, pulling back said inserting bolts 85 and said pin blocks 82 thereof, and compressing said compressing springs 83 thereof. When said inserting bolts 85 and said pin blocks 82 are drawn backwards, said mounting body 81 is raised upwards to abut against the underside of said wheel pivot seat 74 and received at said trapezoid retaining room 745 therein. The mounting pates 746 of said wheel pivot seat 74 are led through the slots 8162 thereof and engaged with said inserting blocks 816 therein. When the withdrawn drawing member 84 is released, said inserting bolts 85 and said pin blocks 82 thereof will be brought back via said compressing springs 83 thereof. Said pin blocks 82 led through said connecting holes 8161 will be relocated at said inserting blocks 816 therein to secure said wheel pivot seat 74 onto said mounting seat 80 thereof. Said mounting seat 80 engaged with said wheel pivot seat 74 thereof is then adapted to said rear carrier A thereof. Said triangular pieces 86 and wing panel 87 are applied from the underside of said mounting body 81 to fixedly secure said mounting seat 80 thereof onto said rear carrier A of a bicycle as shown in FIG. 6.

Figure 7:
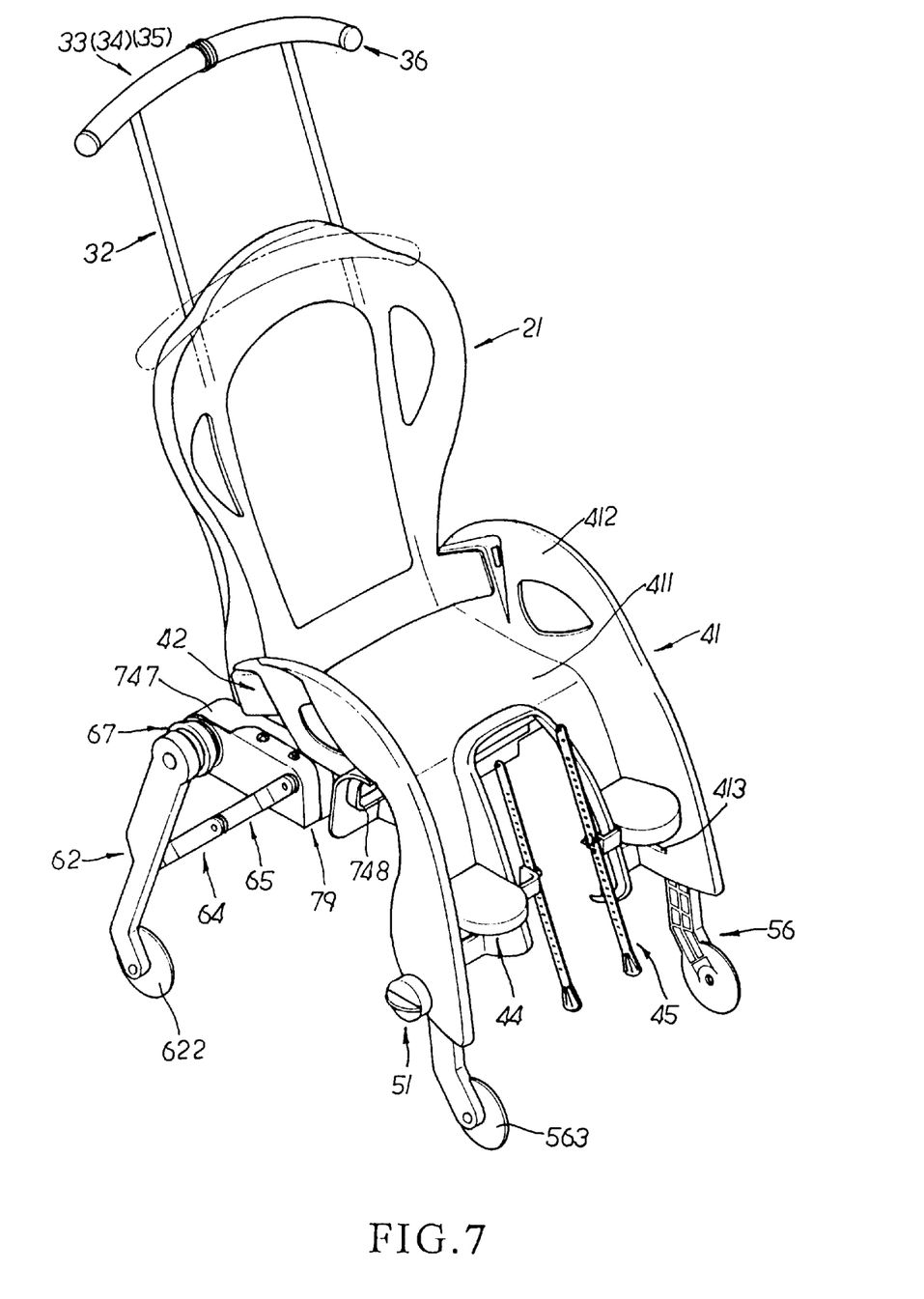
FIG. 7 is a diagram showing the present invention used as a baby stroller.

Please refer to FIG. 7. To use the present invention as a stroller, said back-wheel brackets 62 along with said rotary wheels 67 are pulled backwards for a proper distance. Said compressing springs 66 are thus compressed tight accordingly. After being stretched to the maximum, said back-wheel brackets 62 are released to bring back said rotary wheels 67 via said compressing springs 66. The keys disposed at the surface of said splined shaft 674 thereof will be engaged with the stopper grooves 7472 disposed at the lower surface of said splined joints 7471 thereof, having said rear-wheel brackets 62 relocated in position and said rolling wheels 622 abutted against the ground for use. Said splined projecting holes 621 thereof are securely engaged with said splined grooves 672 thereof, preventing said rear-wheel brackets 62 from dislocation when pushed in practical use.

Said rotary heads 51 are rotated outwards via said locking bolts 52 to get said engaging blocks 53 retained therein and abutted by the compressed big and small springs 54 thereof to slide outwards accordingly. The four engaging legs 532 thereof will be dislocated from the four locating holes 562 of said front-wheel brackets 56 which is then bent downwards for said rolling wheels 563 attached thereto to abut against the ground. Said rotary heads 51 are rotated back to the first place, having said front-wheel brackets 56 re-located via said four engaging legs 532 thereof re-engaged with said four locating holes 562 thereof.

Said eccentric means 26 abutted against said friction blocks 25 at one side are swung in a certain angle to release said friction blocks 25 thereof and produce a gap therebetween. The engaged upper and lower tubes 34, 33 are then pulled upwards to draw up and adjust said extensible inner tubes 32 into a proper height. Said stop parts 31 thereof will prevent said extensible inner tubes 32 from sliding out of said sleeve body 23 thereof. Said eccentric means 26 are then swung back to abut tightly against said friction blocks 25 which will hold the adjusted extensible inner tubes 32 in location for use as shown in FIG. 7.

Figure 8:
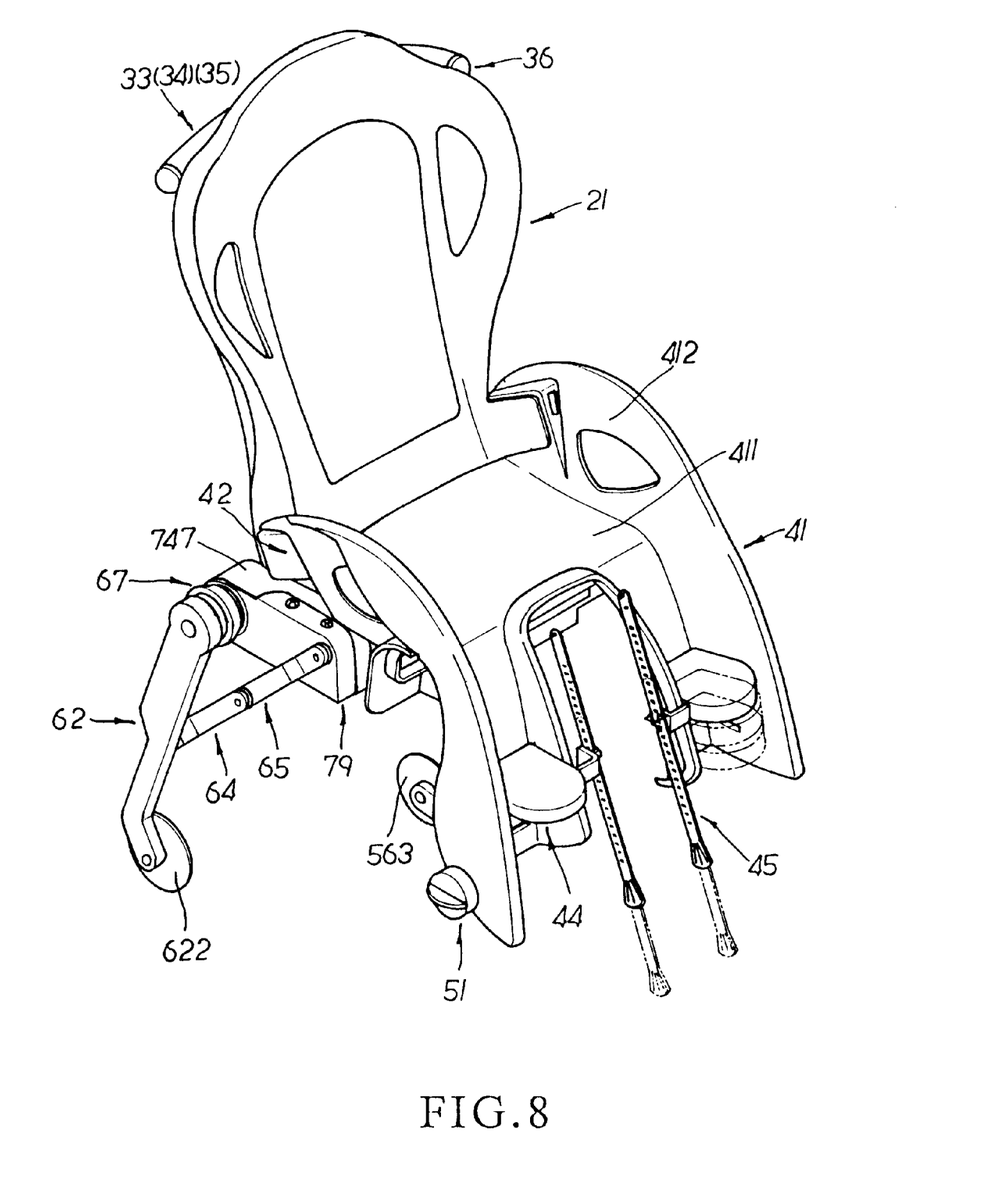
FIG. 8 is a diagram showing the present invention used as a normal baby seat.

Please refer to FIG. 8. To use the present invention as a normal baby seat, both back-wheel brackets 62 are let down first. Said supporting plates are adjusted at said hook pieces 443 thereon into proper height and fixedly located via said elongated locating holes 451 thereof engaged with said locating keys 444 thereof. Said front-wheel brackets 56 are swung inwards and stored away. Said footboards 44 can be dislocated from said inserting slots 413 thereof and relocated into inserting slots 413 of proper height so as to adjust said footboards 44 for use.

What is claimed is:

1. An improved baby seat structure for bicycles, comprising a back unit, a seat unit, an extensible handle set, two front-wheel bracket sets, two rear-wheel bracket sets, a base unit, a mounting seat, a plurality of inserted pins and screws, and a long round rod; wherein:

said back unit is made up of a back body, a securing block, a sleeve body, two fixing members, two friction blocks, two eccentric means, and an extensible handle set wherein the rear side of said back body having a plurality of fixing columns distributed at both upper and lower sections thereof, a plurality of screw holes circumscribed by an indented groove at the middle section thereof, and a pair of arch sliding grooves extending vertically at both left and right sections thereof, a two-stepped locating post being disposed at both lower lateral sides of said back body respectively; said securing block, wide top and narrow bottom in shape, having a plurality of fitting posts disposed thereon and two recesses defining both lateral flanges thereof; said sleeve body, a U-shaped block body, having a pair of semi-round guide ways extending at both left and right arms thereof, a pair of securing plates with securing holes thereon disposed at the top end of each said guide way, an elongated slot disposed at the front side of each said guide way, and an engaging plate having a pair of screw holes and a pair of U-shaped engaging slots defined thereon disposed at the transverse bottom side of said sleeve body thereof; said fixing member having a pair of fixing plates with through holes thereon disposed at both left and right sides thereof, an elongated through hole disposed at the front side thereof and a pair of semi-round fixing parts disposed at both top and bottom sides of said elongated through holes; said friction blocks having elongated grooves disposed at the front side thereof; said eccentric means having an oval-shaped pivot head with a through hole thereon disposed at the one side and a push blade extending at the other end thereof;

said extensible handle set comprising two stop parts, two extensible inner tubes, an upper tube and a lower tube, two outer tubes, and two stopper covers wherein each said stop part, a two-stepped round column, having a pin hole disposed at the outer sphere of the small step thereof; each said extensible inner tube, a round pipe body, having a fixing hole disposed at the outer sphere of both upper and lower ends thereof respectively; said lower tube, a semi-round tubular body, having a plurality of engaging columns equidistantly distributed at the bottom thereof, and a pair of left and right engaging grooves disposed thereon; said upper tube, a semi-round tubular body, having a plurality of engaging posts equidistantly distributed at the bottom thereof, and a pair of left and right projecting fixed columns with inserting holes disposed thereon; said outer tube, a round tubular body, having an engaging groove disposed at the bottom thereof and an engaging hole disposed at one side thereof; each said stopper cover, a semi-round cover body, having a pair of hook plates disposed at the inner side thereof;

said seat unit is equipped with a seat body, two coupling parts, an L-shaped frame, two footboards, and two supporting plates wherein said seat body has an inverted L-shaped seat board, arched side flanges with a multiple of inserting slots disposed thereon projecting at both lateral sides thereof, and a pair of semi-arch receiving grooves each defined by a pair of fixing plates disposed at the lower side of said arched side flanges thereof; one of said fixing plates thereof having four slots disposed thereon; the underside of said seat board having a multiple of serrated engaging ribs and four screw columns, and the front side thereof having an inverted U-shaped recess defined by projecting flanges and inserting slots at the edges thereof; a slant indent being disposed at the rear of each said arch side flange thereof; said coupling part, an elongated box body, having an L-shaped sliding groove disposed at the interior therein, and an elongated fixing piece projecting at the front side thereof; each said footboard having locating pieces disposed at two sides thereof, and an L-shaped hook means with a pair of hook pieces and a locating key disposed thereon projecting at the third side thereof; each said supporting plate having three oval through holes disposed at the bottom thereof, and a multiple of elongated locating holes equidistantly distributed at the middle section thereon;

said front-wheel bracket set comprises a rotary head, a locking bolt, an engaging block, a big spring and a small spring, a front-wheel bracket, and a screw nut wherein said rotary head, a circular cover body, having a rotary plate disposed at the outer top side thereof, and a sleeve rod with an inserted hole thereon projecting at the inner side thereof; said locking bolt having a fining hole disposed at one end thereof and outer threads disposed at the other end thereof; said engaging block, circular in shape, having a slot disposed at the center thereof, and four engaging legs projecting at one side thereof; said front-wheel bracket having a locating groove encircled by four locating holes disposed at one end thereof and a rolling wheel pivotally joined to the other end thereof;

said rear-wheel bracket set comprises a rivet, a rear-wheel bracket, a strengthening plate, a linking plate, an extensible plate, a compressing spring, a rotary wheel, and a multiple of ring washers wherein said rear-wheel bracket having a splined projecting hole disposed at the inner side of one end thereof, and a rolling wheel pivotally joined at the other end thereof with a multiple of screw piles disposed at the inner middle section thereof; said strengthening plate having a multiple of screw holes disposed thereon, and a ring defined by three sets of equidistant engaging keys disposed at one end thereof; said linking plate having a linking hole disposed at both ends thereof respectively, and an abutting block disposed at the bottom side thereof; said extensible plate having a pivot hole disposed on both ends thereof respectively; said rotary wheel having a two-stepped through hole disposed at the center therein, a splined groove with three equidistant indents defined at the inner side thereon disposed at one side thereof, and a splined shaft with a key projected thereon disposed at the other side thereof;

said base unit comprises a base body, two stopper blocks, two springs, a wheel pivot seat, a strengthening piece, two strengthening rods, two spring washers, two adjusting blocks, and two splined plates wherein said base body having a long pivot hole disposed at the front side thereof, a pair of sliding slots disposed at both lateral sides thereof, a multiple of locating flanges equidistantly disposed at the bottom side thereof, a pair of left and right hollow inserting posts, each having four engaging ribs disposed thereon, disposed at the rear side thereof; said stopper block having a two-stepped rotary hole with four engaging holes disposed at the small step thereof disposed at the upper section thereof; said wheel pivot seat having left and right pivot blocks disposed at the front side thereof, four fixing columns disposed at the top surface thereof, an arch shell extending upwards at the rear side thereof, two pivot members with pivot holes disposed at both left and right sides of said arch shell thereof, a trapezoid retaining room with an inserting part, four through holes, and a pair of mounting plates disposed thereon defined at the front bottom side thereof, and a pair of elongated arch splined couplings, each having a splined joint with a slot and two stopper grooves disposed at one side, and two screw columns and a pin hole disposed at the other side, attached at the rear lateral sides thereof, and a pair of left and right wheel guards disposed at the front side thereof; said strengthening piece having a large and a small parts with four screw holes distributed at the small part thereon; said strengthening rod being a two-stepped hollow column; said adjusting block having a two-stepped pivot hinge disposed at one lateral side thereof; said splined plate having a splined hole disposed at one side thereof, an arch flange and a fixing means both of which having a pair of screw holes disposed thereon, and a pin hole disposed at the other side thereof;

said mounting seat is equipped with a mounting body, two pin blocks, two compressing springs, a drawing member, two inserting bolts, two triangular fixing pieces, and a wing panel wherein said mounting body of a trapezoid housing having a slide guide way and a multiple of ribs disposed at the front top side thereof, a multiple of locating posts, and a mounting piece with left and right mounting holes disposed thereon, an inserting piece with left and right U-shaped escape grooves defined thereon, a pair of left and right rectangular inserting blocks with connecting holes disposed at one side corresponding to said U-shaped escape grooves and said mounting holes thereof and an engaging slot disposed at the top thereof, and a U-shaped retaining groove disposed at the underside thereof; said pin blocks, a two-stepped means, having a pin hole disposed at the small step thereof; said drawing member having a pair of mounting columns disposed at the left and right sides thereof, and an arch drawing part disposed at the upper middle section thereof; each said inserting bolt, a two-stepped bolt, having an inserting hole disposed at the front end of the small step; said triangular fixing piece having fixing holes disposed at the three corners thereof; said wing panel having four fitting holes disposed at the four corners thereof;

in assembly, the stop parts are located at the lower end of said extensible inner tubes and fixedly joined thereto via inserted pins; after said upper and lower tubes are fixedly engaged therewith via screws, said outer tube is sleeve joined to the periphery of said engaged upper and lower tubes; said extensible inner tubes are then inserted to said projecting fixed columns thereof and securely joined thereto via inserted pins; said stopper covers are fixed to both ends of said engaged upper, lower, and outer tubes via said hook plates thereof;

said sleeve body is placed at the rear side of said back body; said fixing members are located at the upper section of said semi-round guide ways thereof to fix said sleeve body to said back body via screws; said extensible inner tubes are led through the space formed by said arch sliding grooves and said semi-round guide ways thereof; said friction blocks are led through the elongated through holes thereof and pushed to the inner side of said elongated slots thereof;. said eccentric means are located at said fixing members via inserted pins to abut tightly against said friction blocks at one lateral side thereof; said two-stepped locating posts are guided through the slant indents thereof and located thereto via said coupling parts thereof which can adjust said back body back and forth within said slant indents thereof;

said L-shaped frame is abutted against the rear side of said back body and the underside of said seat body, whose lower section is engaged with said serrated engaging ribs thereof and the upper section thereof is located by the U-shaped engaging slots thereof; said securing block is fixed to the indented groove via screws, limiting the upper end of said L-shaped frame at the recesses therein; said footboards are inserted to the inserting slots of proper height via said locating pieces thereof; said supporting plates are guided through said hook pieces and fixed in location via said locating holes thereof hooked to locating keys of proper height;

said locking bolt is fixedly attached to the sleeve rod of said rotary head thereof via an inserted pin; said engaging block is led through said locking bolt and received at the interior of said rotary head thereof; said big spring engaged with said small spring is sleeve joined to the periphery of said sleeve rod thereof; said front-wheel bracket is located at said receiving groove defined by said fixing plates of said seat body thereof; said locking bolt engaged with said rotary head at one end is led through one of said fixing plates thereof and screwed up to the screw nut disposed at the other fixing plate thereof via said outer threads disposed at the other end thereof with the four engaging legs of said engaging block thereof inserted onto the four slots of said fixing plate thereof and said four locating holes thereof to fixedly locate said front-wheel bracket onto said seat body thereof;

said stopper block is joined to the hollow inserting post via said two-stepped rotary hole; a screw with the spring thereof joined at the periphery thereof is led through the two-stepped rotary hole and fastened to the hollow inserting post with said spring abutted against the small step of said rotary hole thereof; via said hollow inserting post, said stopper block can be rotated up and down thereon;

said strengthening piece is screw joined to the four through holes of said trapezoid retaining room thereof; the small step of said two-step strengthening rod is adapted to cover the top side of said pivot member thereof and said adjusting block is located at the underside of said pivot member and pivotally joined thereto via a screw; via said pivot member, said adjusting block can be swung back and forth thereon;

said long round rod is led through the long pivot hole of said base body and the two pivot blocks of said wheel pivot seat to engage said base body thereof with said wheel pivot seat thereof at the front side thereof; said base body is located at the top surface of said wheel pivot seat, abutting against said adjusting blocks at the rear thereof; said stopper blocks are then rotated downwards at the other side of said adjusting blocks to locate said adjusting blocks, preventing the dislocation of said base body in use;

said wheel pivot seat with said base body located thereon is screw joined to the underside of said seat body via screws, having said L-shaped frame located by said locating flanges of said base body thereof at the bottom end thereof; said splined plates, pivotally joined to said rear wheel brackets via said rotary and said strengthening, linking, and extensible plates, are engaged with said splined couplings to attach said rear-wheel brackets onto said wheel pivot seat thereof;

said two-stepped pin blocks of said mounting seat are led to the connecting holes of said inserting blocks thereof by the small step thereof; said drawing member is engaged with said mounting body thereof via said inserting bolts led through the mounting holes of said mounting piece thereof, said compressing springs thereof, and the U-shaped escape grooves of said inserting piece thereof and sleeve joined to said pin blocks thereof; inserted pins are adapted to fixedly connect said inserting bolts and said pin blocks thereof via said engaging slots of said inserting blocks thereof to complete the assembly of the improved baby seat station;

whereby, the improved baby seat station can be easily adjusted for different uses such as a baby seat for bicycles wherein said mounting seat thereof is fixedly secured onto a rear carrier of a bicycle via said triangular fixing pieces and said panel wing, a baby stroller wherein said front-wheel brackets and said rear-wheel brackets are swung down to abut against the ground while said extensible handle set is drawn to a proper height for use, and a normal baby seat wherein said rear-wheel brackets are swung downwards to abut against the ground while said front-wheel brackets are stored away at said receiving grooves of said seat body thereof, and said supporting plates are adjusted at said L-shaped hook means of said seat body into a proper height to abut against the ground and then located via said locating key thereof engaged with said locating holes of proper height.

2. The improved baby seat structure for bicycles as claimed in claim 1 wherein the two extensible inner tubes thereof can slide in the space formed by the semi-round guide ways of said sleeve body thereof and the arch sliding grooves disposed at the rear side of said back body thereof.

3. The improved baby seat structure for bicycles as claimed in claim 1 wherein said eccentric means abutting against said friction block at one lateral side thereof and attached to said semi-round fixing parts of said fixing members thereof at the top and bottom sides thereof can be swung back and forth thereon.

4. The improved baby seat structure for bicycles as claimed in claim 1 wherein said L-shaped frame can be moved back and forth on said serrated engaging ribs of said seat body thereof for relocation to adjust the angle of said back unit thereof for use.

5. The improved baby seat structure for bicycles as claimed in claim 1 wherein said base body thereof can swing up and down via the two pivot blocks of said wheel pivot seat thereof.

6. The improved baby seat structure for bicycles as claimed in claim 1 wherein said stopper blocks thereof can be rotated up and down via said hollow inserting posts of said base body thereof.

7. The improved baby seat structure for bicycles as claimed in claim 1 wherein said adjusting blocks can be rotated to and fro via said pivot members of said wheel pivot seat thereof.

8. The improved baby seat structure for bicycles as claimed in claim 1 wherein said footboards engaged with said inserting slots of said seat body thereof can be dislocated and adjusted into a proper height before relocated thereto.

9. The improved baby seat structure for bicycles as claimed in claim 1 wherein said supporting plates can be adjusted on the hook pieces of said footboards into a proper height and relocated via said locating keys of said L-shaped hook means engaged with locating holes of proper height thereof.

10. The improved baby seat structure for bicycles as claimed in claim 1 wherein said rotary head can be rotated via said locking bolt secured to one of said fixing plates of said seat body thereof at one end thereof.

11. The improved baby seat structure for bicycles as claimed in claim 1 wherein said engaging block retained at the inner side of said rotary head can slide to and fro therewith when pressed by said compressed big and small springs thereof.

12. The improved baby seat structure for bicycles as claimed in claim 1 wherein said front-wheel brackets can be swung up and down at said semi-arch receiving grooves defined by said fixing plates of said seat body thereof.

13. The improved baby seat structure for bicycles as claim in claim 1 wherein said rear-wheel brackets with said rotary wheels thereof can be swung up and down at said wheel pivot seat thereof via said splined couplings thereof.

14. The improved baby seat structure for bicycles as claimed in claim 1 wherein said mounting seat can be moved up and down to engage with or disengage from said wheel pivot seat thereof.

15. The improved baby seat structure for bicycles as claimed in claim 1 wherein said drawing member can be pulled and released back and forth at the rear of said mounting body thereof.

* * * * *